US012651996B2

(12) United States Patent
Barnes et al.

(10) Patent No.: US 12,651,996 B2
(45) Date of Patent: Jun. 9, 2026

(54) METHOD FOR MANUFACTURING PHOTOVOLTAIC TUBES

(71) Applicant: Taka Solar Corporation, Mountain View, CA (US)

(72) Inventors: Christopher Dwight Barnes, Mountain View, CA (US); Joon Hee Lee, Corona, CA (US); Michael S. Lee, Corona, CA (US)

(73) Assignee: Taka Solar Corporation, Mountain View, CA (US)

( * ) Notice: Subject to any disclaimer, the term of this patent is extended or adjusted under 35 U.S.C. 154(b) by 0 days.

(21) Appl. No.: 19/272,597

(22) Filed: Jul. 17, 2025

(65) Prior Publication Data

US 2026/0025098 A1 Jan. 22, 2026

Related U.S. Application Data

(60) Provisional application No. 63/672,603, filed on Jul. 17, 2024.

(51) Int. Cl.
H02S 30/00 (2014.01)
H02S 20/00 (2014.01)

(52) U.S. Cl.
CPC .............. H02S 30/00 (2013.01); H02S 20/00 (2013.01)

(58) Field of Classification Search
None
See application file for complete search history.

(56) References Cited

U.S. PATENT DOCUMENTS

| | | | |
|---|---|---|---|
| 9,312,424 B1 * | 4/2016 | Hensel | ................... B32B 37/02 |
| 2011/0029746 A1 | 2/2011 | Lee et al. | |
| 2012/0176693 A1 * | 7/2012 | Fitch | .......................... C09J 5/08 |
| | | | 359/848 |
| 2014/0116495 A1 | 5/2014 | Kim et al. | |
| 2014/0196765 A1 | 7/2014 | Lam et al. | |

(Continued)

OTHER PUBLICATIONS

International Search Report and Written Opinion for International Application No. PCT/US25/38112 mailed on Sep. 22, 2025; 11 pages.

(Continued)

*Primary Examiner* — Eli S Mekhlin

(74) *Attorney, Agent, or Firm* — Run8 Patent Group, LLC; Peter Miller

(57) ABSTRACT

A method for manufacturing a photovoltaic tube includes: dispensing encapsulant material onto a segment of a circular cross-section of the transparent tube; and drawing a vacuum at perforations on a mandrel to transiently retain a solar module on the mandrel. The method also includes navigating the mandrel into the transparent tube to locate the solar module: facing the encapsulant material; and at an offset distance from the segment of the circular cross-section of the transparent tube. The method also includes closing the offset distance to: press the solar module, retained on the mandrel, against the encapsulant material; and adhere the solar module to the segment of the circular cross-section of the transparent tube. The method further includes: releasing the vacuum at the perforations on the mandrel to release the solar module from the mandrel; and withdrawing the mandrel from the transparent tube.

15 Claims, 5 Drawing Sheets

(56) References Cited

U.S. PATENT DOCUMENTS

2021/0053230 A1    2/2021  Mizoguchi et al.
2021/0407739 A1* 12/2021  Barnes ................... H10F 19/80

OTHER PUBLICATIONS

Notification of the International Application Number and of the International Filing Date for International Application No. PCT/US25/038112 mailed on Aug. 19, 2025; 1 page.

* cited by examiner

S100

"MANDREL"     S140     "TRANSPARENT TUBE"     S110

"SOLAR CELLS"     "SOLAR MODULE"

"MANDREL"     "TRANSPARENT TUBE"

"PERFORATION"     S130

"NOZZLE"

"SOLAR MODULE"     S120     "ENCAPSULANT MATERIAL"

2

METHOD FOR MANUFACTURING PHOTOVOLTAIC TUBES

CROSS-REFERENCE TO RELATED APPLICATIONS

This Application claims the benefit of U.S. Provisional Application No. 63/672,603, filed on 17 Jul. 2025, which is hereby incorporated in its entirety by this reference.

This Application is also related to U.S. Non-Provisional application Ser. No. 18/237,857, filed on 24 Aug. 2023, which is hereby incorporated in its entirety by this reference.

TECHNICAL FIELD

This invention relates generally to the field of solar module manufacturing and, more specifically, to a new and useful system and method for manufacturing a photovoltaic tube in the field of solar module manufacturing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
FIG. 1 is a flowchart representation of a method.
Figure 2:
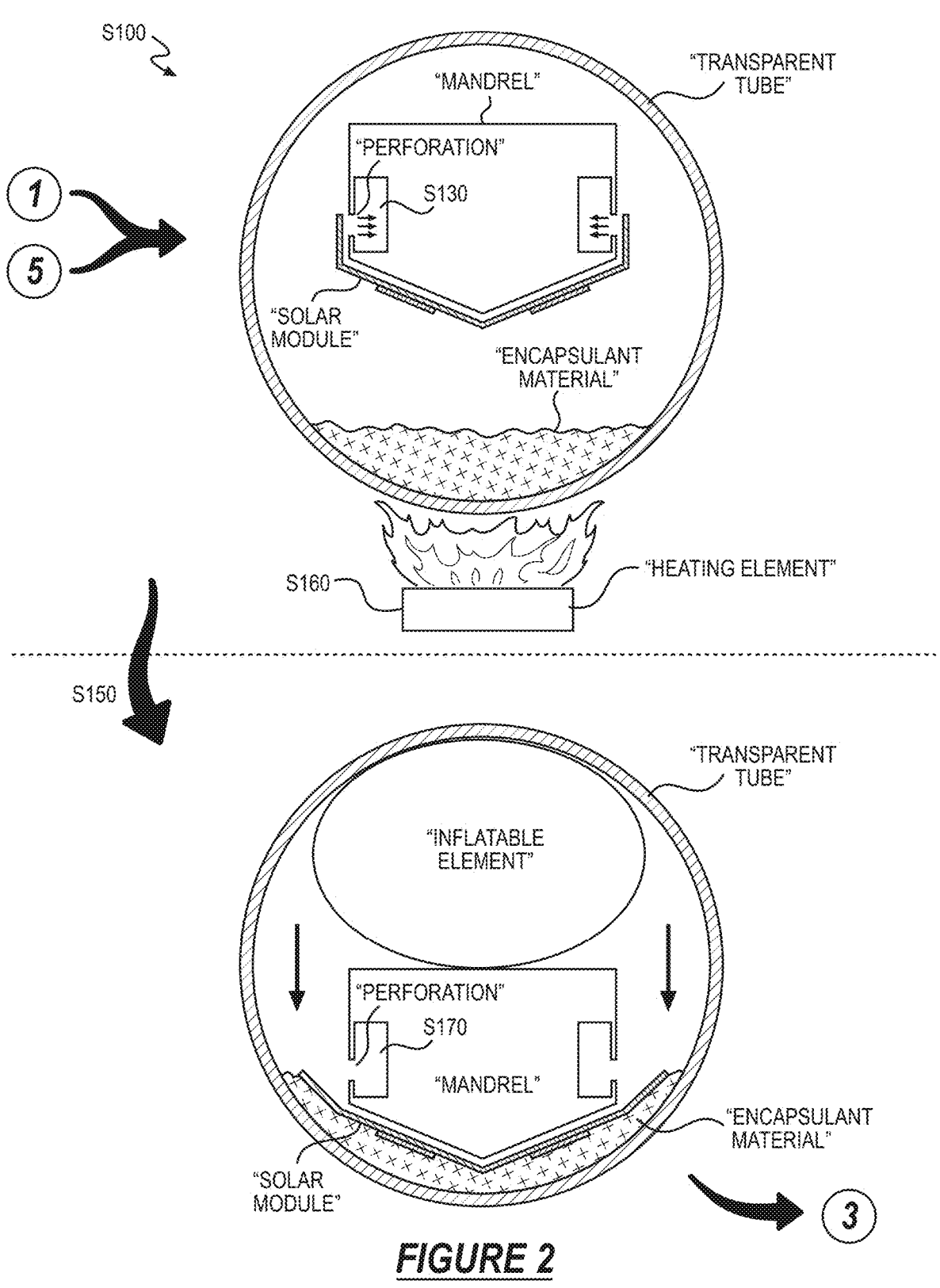
FIG. 2 is a flowchart representation of the method.
Figure 3:
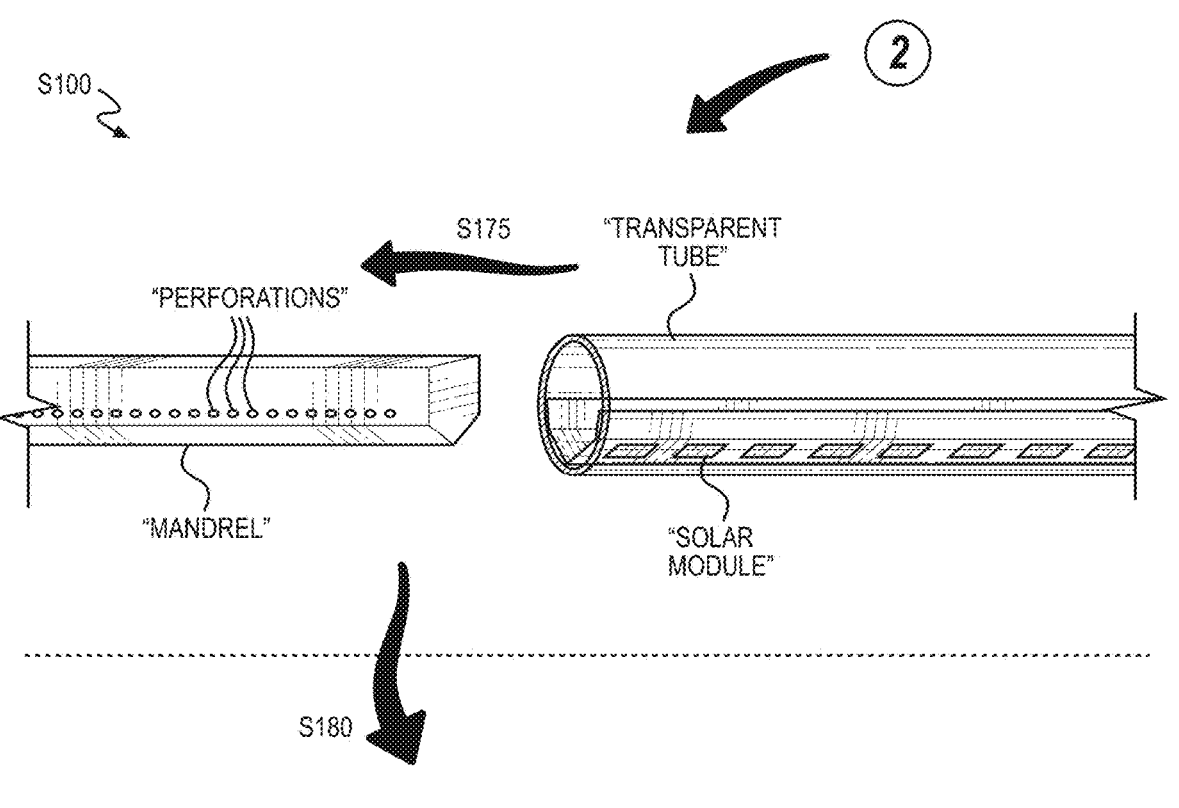
FIG. 3 is a flowchart representation of the method.
Figure 3:
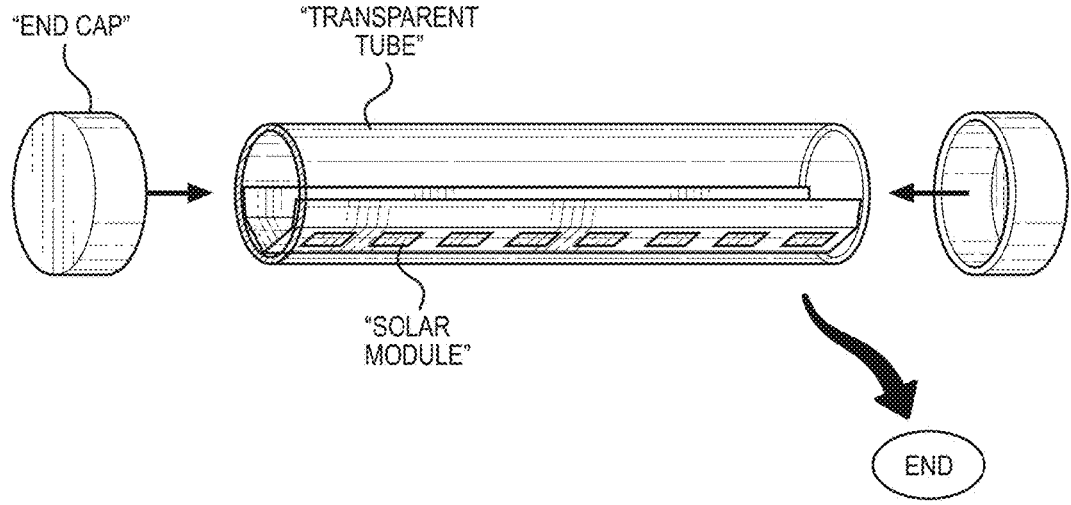

As shown in FIGS. 1 and 2, Blocks of a method S100 for manufacturing a photovoltaic tube includes: loading a transparent tube onto a jig in Block S110; dispensing a primary encapsulant material onto a primary segment of a circular cross-section of the transparent tube in Block S120; and drawing a vacuum at a set of perforations on a mandrel to transiently retain a solar module on the mandrel in Block S130.

Blocks of the method S100 further include navigating the mandrel into the transparent tube, in Block S140, to locate the solar module: facing the primary encapsulant material on the primary segment of the circular cross-section of the transparent tube; and at an offset distance from the primary segment of the circular cross-section of the transparent tube.

Blocks of the method S100 also include closing the offset distance, in Block S150, to: press the solar module, retained on the mandrel, against the primary encapsulant material; and adhere the solar module to the primary segment of the circular cross-section of the transparent tube.

Blocks of the method S100 further include: releasing the vacuum at the set of perforations on the mandrel to release the solar module from the mandrel in Block S170; and withdrawing the mandrel from the transparent tube in Block S175.

1.1 Variation: Solar Module+Sheet of Encapsulant Material

Figure 4:
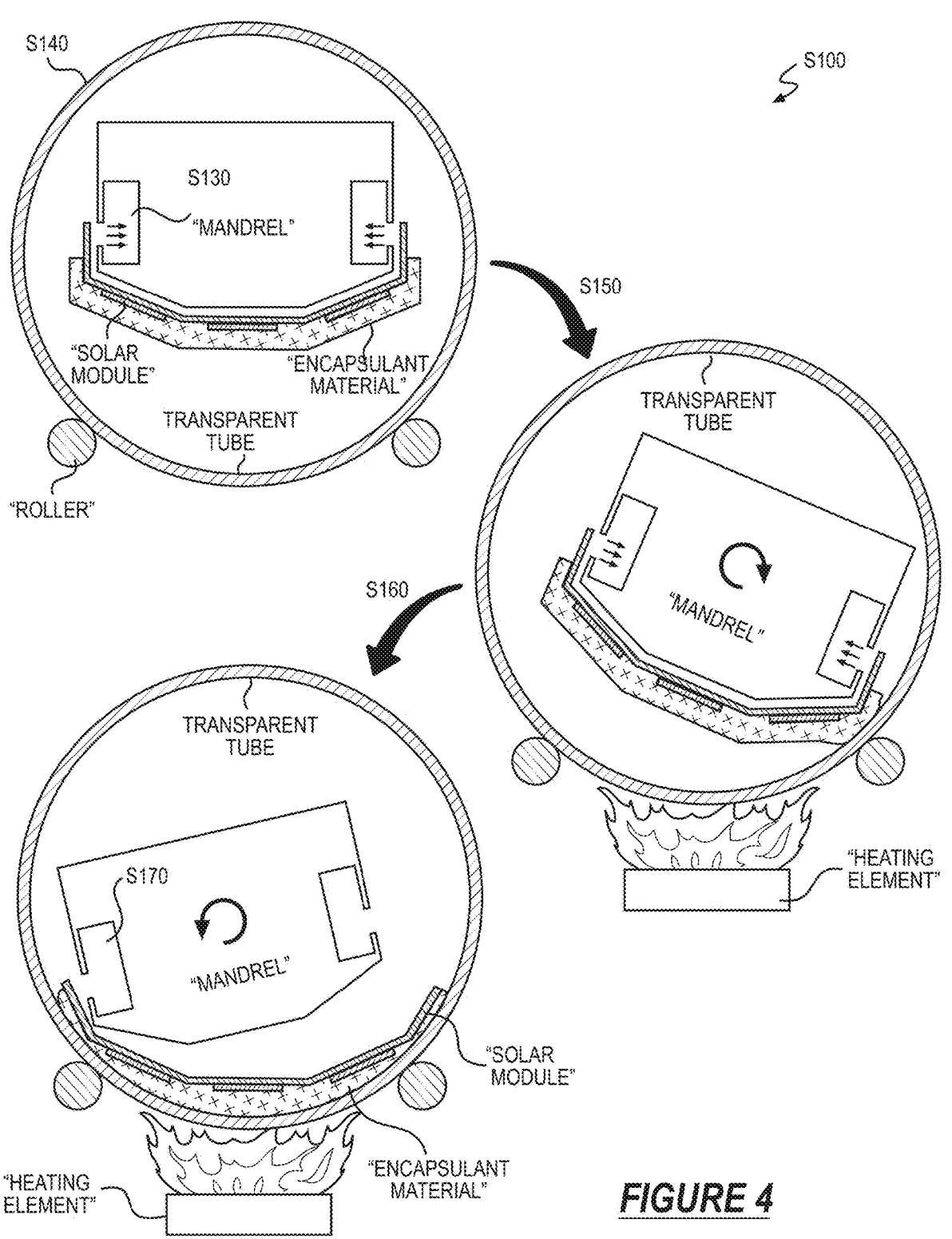
FIG. 4 is a flowchart representation of one variation of the method.
Figure 5:
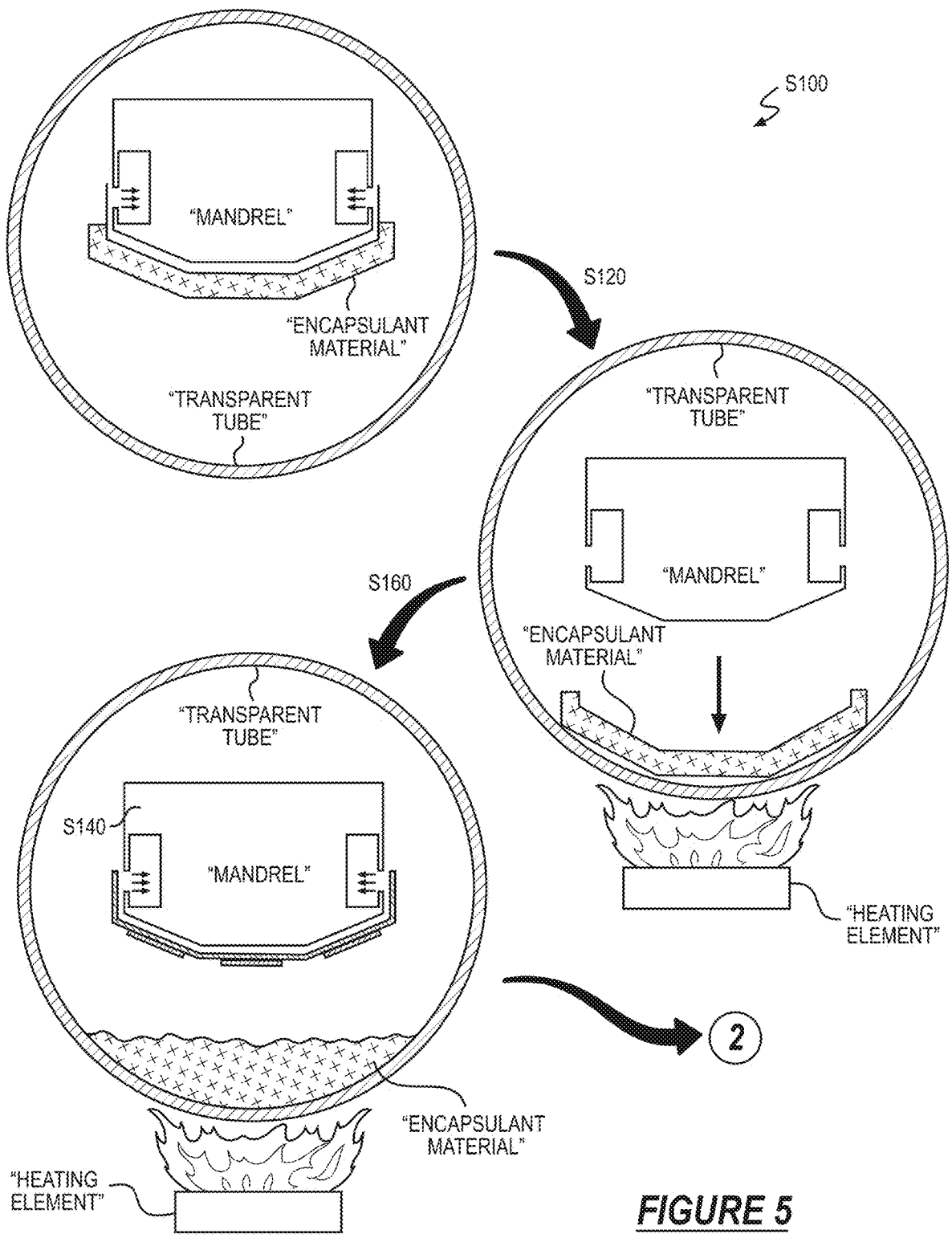
FIG. 5 is a flowchart representation of one variation of the method.

As shown in FIGS. 1 and 4, Blocks of a method S100 for manufacturing a photovoltaic tube include: loading a transparent tube onto a jig in Block S110; and drawing a vacuum at a set of perforations on a mandrel to transiently retain a solar module on the mandrel in Block S130. The solar module includes a sheet of encapsulant material arranged across an outer face of the solar module.

Blocks of the method S100 further include navigating the mandrel into the transparent tube, in Block S140, to locate the outer face of the solar module at an offset distance from the primary segment of the circular cross-section of the transparent tube.

Blocks of the method S100 also include, during an adhesion period: in Block S150, closing the offset distance to press the sheet of encapsulant material, arranged across the outer face of the solar module retained on the mandrel, against the primary segment of the circular cross-section of the transparent tube; and, in Block S160, activating a heating element arranged proximal the transparent tube to transition the sheet of encapsulant material to a viscous encapsulant material and to adhere the solar module to the primary segment of the circular cross-section of the transparent tube.

Blocks of the method S100 further include: releasing the vacuum at the set of perforations on the mandrel to release the solar module from the mandrel in Block S170; and withdrawing the mandrel from the transparent tube in Block S175.

2. Applications

Generally, Blocks of the method S100 can be executed to manufacture a unit of a sealed tubular solar cell system (or "a photovoltaic tube"). More specifically, Blocks of the method S100 can be executed to: laminate (e.g., via encapsulant material) a set of solar cells (e.g., bifacial solar cells) across an interior surface of a cylindrical glass housing (hereinafter the "transparent tube"); and bond a solar module—including the set of solar cells (e.g., bifacial solar cells)—across a circular segment (e.g., half-segment) of the cylindrical transparent tube to form a unit of a tubular solar cell system.

In particular, the solar module can include: a flexible backing; a primary row of solar cells (e.g., bifacial solar cells) arranged across a top surface of the flexible backing; and a secondary row of solar cells (e.g., bifacial solar cells) arranged adjacent the primary row of solar cells and across the top surface of the flexible backing. Lamination techniques (e.g., solar cell lamination) can then be implemented to bond the primary and secondary row of solar cells to the backing. The solar module can then be arranged on a mandrel (e.g., via a vacuum chuck integrated into the mandrel) in preparation for a lamination-assembly operation. The mandrel can include: a linear body approximating a length of the transparent tube and configured to insert within the transparent tube; a set of perforations arranged across the body; and a manifold arranged within the body and coupling the set of perforations to a vacuum supply. Additionally, the mandrel can include an adhesive dispenser (e.g., a hopper for solid/liquid adhesive, nozzle, adhesive supply line): arranged within the mandrel; including a primary end coupled to a feeding mechanism configured to supply encapsulant material (e.g., platinum-curing silicone, polyolefin elastomer, ethylene-vinyl acetate); and a secondary end coupled to a nozzle (e.g., heating nozzle) arranged proximal a distal end of the mandrel and configured to dispense viscous encapsulant material. In preparation for the lamination-assembly operation, an operator can: locate the solar module on the mandrel, such that the backing extends across the set of perforations on the mandrel; and trigger the vacuum supply to draw a vacuum on the manifold and thus, retain the solar module via the backing across the set of perforations.

Thus, during insertion of the mandrel within the transparent tube (hereinafter the "insertion process"), the nozzle can dispense encapsulant material (e.g., viscous encapsulant material) across a primary segment (e.g., half-section) of the circular cross-section of the transparent tube while concurrently, locating the solar module adjacent the primary segment opposite the encapsulant material dispensed during the insertion process. Alternatively, rather than dispensing adhesive material at an integrated adhesive dispenser at the mandrel, a separate adhesive dispenser can be implemented to dispense solid adhesive material (e.g., pellets) across the primary segment prior to insertion of the mandrel within the transparent tube. Additionally, the transparent tube can then be heated (e.g., via heat gun, electrical tape) to transition the solid adhesive material within the transparent tube into a viscous adhesive material.

Furthermore, while maintaining the mandrel within the transparent tube, an inflatable element—such as arranged across the mandrel opposite the solar module and coupled to an air supply—can be transitioned into an expanded configuration to apply pressure within the transparent tube and thus, compress the solar module toward the encapsulant material, thereby laminating the solar cells arranged across the inner surface of the transparent tube and bonding the solar module to across the primary segment of the circular cross section of the transparent tube.

The inflatable element can then be transitioned into the contracted configuration and the solar module released (e.g., via the vacuum supply) from the mandrel in order to extract the mandrel—and therefore the inflatable element and the nozzle—from the interior of the transparent tube. A set of caps can then: be arranged at opposite ends of the transparent tube to enclose the solar module within the transparent tube; and receive a set of electronic pins coupled to the solar cells arranged across the solar module.

Alternatively, rather than implementation of an inflatable element to apply pressure within the transparent tube, the mandrel can rest within the transparent tube, such that the weight of the transparent tube applies pressure to compress the solar module toward the encapsulant material. Additionally, a ski (e.g., support fixture) can be arranged within the transparent tube and/or outside of the transparent tube to cooperate with the weight of the mandrel to apply pressure to compress the solar module toward the encapsulant material. Furthermore, a vacuum supply can be triggered to draw a vacuum within the transparent tube that cooperates with the pressure applied to the transparent tube to bond the solar cells with the adhesive material within the transparent tube.

Therefore, during a single insertion and extraction operation of the mandrel within the transparent tube: the set of solar cells arranged on the solar module is adhered and laminated across a primary segment of a circular cross section of the transparent tube; and the solar module is bonded across the primary segment.

2.1 Air Gaps+Solar Module Lamination

In one implementation, Blocks of the method S100 can be executed to: press the solar module—retained on the mandrel—against the encapsulant material arranged on the segment of the circular cross-section of the transparent tube; displace trapped air between an outer face of the solar module and the segment of the circular cross-section; and adhere and laminate the solar module to the segment of the circular cross-section.

In this implementation, the encapsulant material is characterized by a refractive index that approximates a refractive index of the transparent tube (e.g., a borosilicate glass tube). Thus, the encapsulant material functions to: mechanically adhere and laminate the solar module to the segment of the circular cross-section of the transparent tube; and transmit incident light through the transparent tube and the encapsulant material to the solar module with minimal optical loss or reflection that results from refractive index mismatch or interfacial air gaps between the encapsulant material, the transparent tube, and the solar module.

In one example, the weight of the transparent tube applies pressure against the solar module during the pressing operation, thereby displacing trapped air between the outer face of the solar module and the segment of the circular cross-section of the transparent tube.

In another example, expansion of an inflatable element—coupled to the mandrel and arranged within the transparent tube—applies pressure, via the mandrel, against the solar module, resulting in displacement of trapped air between the outer face of the solar module and the segment of the circular cross-section of the transparent tube.

Therefore, rather than placing the interior of the transparent tube under vacuum to eliminate trapped air between the solar module and the segment of the circular cross-section, the mandrel applies pressure that displaces trapped air between the solar module and the segment of the circular cross-section to: maintain optical and electrical performance of the solar module within the transparent tube; and reduce manufacturing cost and cycle time associated with vacuum-based lamination processes.

3. Solar Cell System

In one implementation, as described in U.S. Non-Provisional application Ser. No. 18/237,857, each solar tube (or "solar electric tube") includes: a transparent tube; a set of solar cells, such as arranged in rows; a reflective element; an encapsulating material; and a set of electrical pins. The transparent tube defines: a circular cross-section; a primary end; and a secondary end opposite the primary end. The set of solar cells: is arranged in the transparent tube; occupies a primary segment (e.g., the top-half circular segment) of the circular cross-section of the transparent tube; includes a primary row of solar cells about an axis of the transparent tube; and includes a secondary row of solar cells angularly offset from the primary row of solar cells about an axis of the transparent tube. The reflective element: is arranged in the transparent tube; occupies a secondary segment (e.g., the bottom-half circular segment) of the circular cross-section of the transparent tube opposite the primary segment; and faces the set of solar cells. The set of electrical pins: is coupled to the set of solar cells; pass through the primary end of the transparent tube; and are sealed about the primary end of the transparent tube.

However, the solar tube can include any other elements arranged in any other way to form a high-aspect ratio (i.e., long and narrow) assembly, such as with a circular, polygonal, or ellipsoidal cross-section.

2.1 Mechanical Connectors

As described in U.S. Provisional Application No. 63/061,728, each solar tube further includes a set of mechanical connectors (hereinafter "end caps") arranged on the ends of the solar tube, configured to couple to a pair of cables, and configured to carry the weight of the solar tube into these cables.

3.1.1 Solar Tube Interface

In one implementation, as described in U.S. Provisional Application No. 63/061,728, the solar tube includes a primary end cap arranged on a primary end of the solar tube and a secondary end cap arranged on a secondary end, opposite the primary end, of the solar tube. In this implementation, the primary end cap can define an internal tube bore configured to receive the primary end of the tube. The primary end cap can also include a pair of pin bores configured to align with and receive the pair of electrical pins extending from the primary end of the solar tube.

For example, the primary end cap can define an internal tube bore sized for a running fit with the primary end of the solar tube, and the pin bores can be oversized for the electrical pins. To assemble the primary end cap onto the primary end of the solar tube, a UV-stable epoxy is loaded into the tube bore of the primary end cap; the electrical pins are then aligned with the pin bores of the primary end cap, and the primary end of the solar tube is inserted into the tube bore with electrical pins extending into and offset from the pin bores. The epoxy thus bonds the primary end of the solar tube to the primary end cap with the electrical pins physically isolated from the primary end cap and accessible to a plug connector.

In this example, the primary end cap can be fabricated in a conductive material, such as diecast aluminum. Accordingly, the pin bores in the primary end cap can be oversized for the electrical pins, and the gap between each electrical pin and its corresponding pin bore can be filled with a potting material, such as with the epoxy described above concurrent with assembly of the primary end cap onto the primary end of the solar tube or with a silicone rubber gel after assembly of the primary end cap onto the primary end of the transparent tube. Alternatively, the primary end cap can be manufactured in a non-conductive material, such as molded fiberglass or an injection-molded UV-stable polymer (e.g., PVDF, PTFE); and the pin bores in the primary end cap can be sized for a close (e.g., running) fit with the electrical pins such that the primary end cap mechanically supports these pins cantilevered from the primary end of the solar tube.

In this implementation, the primary end of the solar tube can also include retention features configured to mechanically resist separation of the solar tube from the primary end cap. For example: a convex dimple can be molded into the transparent tube at (or near) its primary end when the primary end of the solar tube is closed during manufacture; and the primary end cap can define a complementary receiver in the tube bore and perpendicular to the longitudinal axis of the tube bore. The dimple on the transparent tube can thus seat in the receiver once the primary end of the solar tube is inserted into the primary end cap. Alternatively, the tube bore can define an L-shaped groove, and the primary end of the solar tube can be inserted into the primary end cap by aligning the dimple to a longitudinal section of the groove and then rotating the solar tube to seat the dimple in the radial section of the groove, thereby longitudinally locking the primary end cap to the primary end of the solar tube.

3.1.2 Cable Interface

In one implementation, as described in U.S. Provisional Application No. 63/061,728, each cable includes locating features (or "stops") configured to maintain pitch distances between adjacent solar tubes. In this implementation, each end cap, in the set of end caps, can include a cable interface in the form of a clip, loop, hook, or bore configured to receive a cable, to carry the weight of the solar tube into the cable, and to engage locating features on the cable to maintain a target pitch distance to an adjacent solar tube installed on the cable.

2.2 Solar Cell Lamination

In one implementation, prior to locating the set of solar cells onto the mandrel, the solar cells can be arranged into a laminated solar module, such as including: a flexible backing (e.g., transparent polymer, silicone); a primary encapsulant layer (e.g., Ethylene-Vinyl Acetate) arranged over the backing; a primary row of solar cells arranged over the primary encapsulant layer; a secondary row of solar cells arranged adjacent the primary row of solar cells and over the primary encapsulant layer; and a secondary encapsulant layer (e.g., Ethylene-Vinyl Acetate) arranged over the primary row of solar cells and the secondary row of solar cells. Accordingly, lamination techniques can be implemented (e.g., solar laminator) to encapsulant the primary row of solar cells and the secondary row of solar cells over the backing.

In another implementation, the flexible backing is formed of a cross-linkable adhesive material that thermally transitions during the lamination process and chemically cross-links with the primary encapsulant layer and the second encapsulant layer once each has reached a viscous state. This cross-linking occurs during pressing and heating of the solar module onto the segment of the circular cross-section of the transparent tube, resulting in an integrated encapsulation structure.

Thus, as described below, in preparation for adhesion of the solar cells within the transparent tube, the solar module can be inserted within the transparent tube, such as via a mandrel.

4. Method of Manufacture

A solar cell system of the type described above can be manufactured and assembled by executing Blocks of the Method S100.

4.1 Loading the Transparent Tube

Blocks of the Method S100 recite loading a transparent tube onto a jig in Block S110.

Generally, in Block S100, the transparent tube can be manually or autonomously loaded onto a transparent tube that aligns the transparent tube coaxial with the mandrel.

In one implementation, the jig can include: a set of alignment features configured to coaxially align the transparent tube with the mandrel; and a set of retention features configured to constrain translational and rotational movement of the transparent tube, such as during insertion of the mandrel into the transparent tube and/or during closing of the offset distance—within the transparent tube—to press the mandrel onto the segment of the circular cross-section of the transparent tube. For example, the jig can include: a semi-cylindrical cradle configured to receive and laterally constrain the transparent tube; a set of clamps that transiently couple to the transparent tube to constrain axial movement of the transparent tube; and a channel configured to guide the mandrel along an insertion axis coaxial with a bore of the transparent tube.

Accordingly, an operator can manually load the transparent tube onto the jig by: positioning the transparent tube onto the jig such that the transparent tube seats into the alignment features of the jig; and engaging retention features (e.g., clamps) on the jig to the transparent tube. In another example, a controller can trigger a set of actuators (e.g., a robotic arm, a rotary loader) to autonomously: retrieve the transparent tube, such as from a storage rack; and mount the transparent tube onto the jig.

Therefore, the jig enables repeated insertion of the mandrel into successive instances of the transparent tube while maintaining consistent coaxial alignment and constrained positioning of the transparent tube across insertion and pressing operations during manufacturing of photovoltaic tubes.

4.2 Mandrel

Blocks of the Method S100 recite drawing a vacuum at a set of perforations on a mandrel to transiently retain a solar module on the mandrel in Block S130.

Generally, in Block S130, the mandrel is configured to vacuum couple the set of solar cells (i.e., the solar module) to enable insertion and dispensing of the set of solar cells within the transparent tube during the adhesion process of the set of solar cells to the transparent tube. For example, a controller can trigger a vacuum pump to draw vacuum at a set of perforations on the mandrel to transiently retain the solar module on the mandrel. In another example, the mandrel is coupled to a vacuum supply configured to continuously draw vacuum at the set of perforations during retention of the solar module on the mandrel.

In one implementation, the mandrel can include: a base approximating a length (e.g., three meters) of the transparent tube, and defining a distal end and a proximal end; a primary inclined face extending from the base; and a secondary inclined face, opposite the primary inclined face, extending from the base and cooperating with the primary inclined face and the secondary inclined face to form a linear triangular body. Furthermore, the mandrel can include: a primary set of perforations arranged across the primary inclined face; a secondary set of perforations arranged across the secondary inclined face; and a manifold arranged within the linear triangular body, and coupled to the primary and secondary set of perforations on the body. Accordingly, the proximal end of the mandrel can include a valve (e.g., gate valve, ball valve) configured to couple to the vacuum supply. Thus, upon triggering of the vacuum supply, a suction force is induced across the primary and secondary set of perforations across the mandrel. The mandrel can also include a wheel: arranged at a distal end of the mandrel; and extending from an apex of the mandrel (i.e., the apex defined by the primary inclined face and the secondary inclined face). Thus, during insertion of the mandrel within the transparent tube, the wheel is configured to: support a weight of the mandrel to maintain the mandrel in a substantially linear orientation within the transparent tube; and linearly guide the mandrel during traversal within the transparent tube.

In this implementation, in preparation for the adhesion process of the solar cells to the transparent tube, an operator can couple the proximal end of the mandrel to a chuck (e.g., three-jaw chuck, collet chuck) in a base-down orientation, such that an apex of the mandrel faces upward. In one example, the valve (e.g., gate valve, ball valve) at the proximal end of the mandrel extends through the central bore of the chuck to couple the vacuum supply. An operator can then locate the solar module, such that the backing of the solar module is vacuum coupled across the primary and secondary sets of perforations across the mandrel. More specifically, the solar module is located onto the mandrel, such that: the primary set of solar cells aligns to the primary inclined face of the mandrel; and the secondary set of solar cells, adjacent the primary set of solar cells, aligns to the secondary inclined face of the mandrel. Other variations of the mandrel can include additional facets configured to receive additional rows of solar cells on the solar module.

Upon locating the solar module onto the mandrel, the vacuum supply can be triggered to induce a suction force across the primary and secondary set of perforations across the mandrel and thus, vacuum couple the solar module to the mandrel. In one example, the transparent tube can then be arranged on a fixture to receive the mandrel. Accordingly, the mandrel—coupled to the solar module—can then be maneuvered (e.g., rotated) within the transparent tube while maintaining the vacuum at the perforations on the mandrel to retain the solar module to the mandrel. Furthermore, upon insertion of the mandrel within the transparent tube, the vacuum supply can be switched-off to decouple the solar module from the mandrel, thus dispensing the solar module within the transparent tube.

4.2.1 Navigating the Mandrel

Blocks of the method S100 further recite, in Block S140, navigating the mandrel into the transparent tube to locate the solar module: facing the primary encapsulant material on the primary segment of the circular cross-section of the transparent tube; and at an offset distance from the primary segment of the circular cross-section of the transparent tube.

Generally, in Block S140, the mandrel can be manually or autonomously positioned within the transparent tube in preparation for adhering the solar module, retained on the mandrel, to the segment of the circular cross-section of the transparent tube.

In one implementation, an operator can manually load the mandrel, retaining the solar module, into the transparent tube using the jig. The operator can leverage the guide features of the jig to position the solar module facing the primary encapsulant material on the primary segment of the circular cross-section of the transparent tube and at an offset distance from the primary segment. In another implementation, a controller can trigger a set of actuators to maneuver the mandrel into the transparent tube to locate the solar module: facing the primary encapsulant material on the primary segment of the circular cross-section of the transparent tube; and at the offset distance from the primary segment of the circular cross-section of the transparent tube.

In one example, the mandrel approximates a length of the transparent tube. In this example, the distal end of the mandrel is inserted into the transparent tube until the distal end extends from an opposite end of the transparent tube. Accordingly, the mandrel is then cantilevered from a proximal end to position the solar module facing the encapsulant material on the segment of the circular cross-section of the transparent tube and at the offset distance from the segment. In another example, the mandrel is inserted entirely through the transparent tube such that the distal end of the mandrel: exits the opposite end of the transparent tube; and engages a retention feature and/or actuator at the opposite end of the transparent tube to stabilize and level the solar module facing the encapsulant material on the segment of the circular cross-section of the transparent tube and at the offset distance from the segment.

Therefore, prior to pressing the solar module onto the encapsulant material, the mandrel is inserted into the transparent tube to position the solar module: facing the encapsulant material on the segment of the circular cross-section of the transparent tube; and at the offset distance from the segment in preparation for an adhesion process.

4.2 Encapsulant Application

Blocks of the method S100 recite dispensing a primary encapsulant material onto a primary segment of a circular cross-section of the transparent tube in Block S120.

Generally, in Block S120, encapsulant material such as encapsulant pellets (e.g., platinum-curing silicone pellets), viscous encapsulant material (e.g., liquid platinum-curing silicone), or sheet of encapsulant materials (e.g., Ethylene- Vinyl Acetate), is dispensed across the primary segment of the transparent tube in order to couple the solar module to the inner surface of the transparent tube. For example, an adhesive dispenser—such as a hopper for solid encapsulant material or liquid encapsulant material, a nozzle, an adhesive supply line—is configured to dispense the encapsulant material within the transparent tube.

4.2.1 Integrated Adhesive Dispenser+Pellets

In one implementation, the adhesive dispenser includes a hopper—such as integrated into the mandrel—configured to concurrently dispense encapsulant pellets (e.g., platinum-curing silicone pellets) during an insertion operation of the mandrel into the transparent tube, thereby dispensing pellets of encapsulant material across the primary segment of the circular cross-section of the transparent tube.

In this implementation, the mandrel can include a hose: arranged within the mandrel; including a primary end configured to receive pellets of encapsulant material from a feeding mechanism; and including a secondary end coupled to the hopper and arranged proximal the distal end of the mandrel adjacent the wheel (e.g., behind the wheel). Accordingly, during insertion of the mandrel within the transparent tube, the feeding mechanism can be triggered to dispense encapsulant material pellets from the secondary end of the hopper at the distal end of the mandrel. Following dispensing of the encapsulant material pellets within the transparent tube, thermal energy can then be supplied to the transparent tube in order to melt the encapsulant material pellets into a viscous material. For example, thermal energy can be supplied via a heat gun directed across the primary segment of the circular cross section of the transparent tube and/or a heating jacket (e.g., heating tape) coupled to the transparent tube. The encapsulant material pellets can then melt and form an event surge of viscous encapsulant material across the primary segment of the circular cross-section of the transparent tube. Furthermore, following a duration of time (e.g., one hour) to allow the encapsulant material to distribute within the transparent tube and release air bubbles, the mandrel supporting the laminate solar cell assembly can then be inserted into the transparent tube.

In another variation, an adhesive dispenser—separate from the mandrel—can be implemented in order to dispense encapsulant material pellets across the primary segment of the circular cross-section of the transparent tube.

4.2.2 Integrated Nozzle

In one implementation, the adhesive dispenser includes a nozzle (e.g., heated nozzle)—such as integrated into the mandrel—configured to dispense encapsulant liquid material (e.g., viscous platinum-curing silicone) concurrently during an insertion operation of the mandrel into the transparent tube, thereby dispensing viscous encapsulant material across the primary segment of the circular cross-section of the transparent tube.

In this implementation, the mandrel can include a hose and a nozzle (e.g., heated nozzle) configured to dispense viscous encapsulant material. The hose: is arranged within the mandrel; includes a primary end configured to receive pellets of encapsulant material from the feeding mechanism; and a secondary end coupled to a nozzle (e.g., heated nozzle) arranged proximal the distal end of the mandrel adjacent the wheel (e.g., behind the wheel). Accordingly, during insertion of the mandrel within the transparent tube, the feeding mechanism can be triggered to dispense encapsulant material—in viscous form—from the nozzle (e.g., heated nozzle) at the distal end of the mandrel. Therefore, the system can concurrently: locate the solar module supported on the mandrel adjacent the primary segment of the circular cross-section of the transparent tube; and dispense viscous encapsulant material in preparation for application of the solar module to the primary segment of the transparent tube. Similarly, in this implementation, following a duration of time to allow for encapsulant material distribution and air bubble release, the mandrel supporting the laminate solar cell assembly can then be inserted into the transparent tube.

In another variation, a nozzle (e.g., heated nozzle)—separate from the mandrel—can be implemented in order to dispense viscous encapsulant material across the primary segment of the circular cross-section of the transparent tube.

4.2.2 Solid Encapsulant Material+Heating Element

Blocks of the method S100 recite, in Block S160, activating a heating element arranged proximal the transparent tube to transition the solid encapsulant material into a viscous encapsulant material on the primary segment of the circular cross-section of the transparent tube.

Generally, in Block S160, following dispensation of solid encapsulant material, such as pellets of encapsulant material and/or a sheet of encapsulant material, onto the segment of the circular cross-section of the transparent tube, a heating element can be manually or autonomously activated to transition the solid encapsulant material into a viscous encapsulant material for adhesion and lamination of the solar module to the segment of the circular cross-section of the transparent tube.

In one implementation, as described above, solid encapsulant material (e.g., pellets of encapsulant material) is dispensed from a nozzle and/or a hopper at the distal end of the mandrel during navigation of the mandrel into the transparent tube. Accordingly, the heating element is then activated—such as by lighting a burner arranged below the transparent tube or supplying current to a resistive heating sleeve thermally coupled to the transparent tube—to transition the solid encapsulant material to a viscous encapsulant material. Thus, the viscous encapsulant material substantially fills and occupies the segment of the circular cross-section of the transparent tube in preparation for lamination of the solar module onto the segment.

For example, the heating element can maintain the viscous encapsulant material at a bonding temperature within a predefined range (e.g., $80°$ C. to $130°$ C.) sufficient to preserve flowability and surface conformity of the viscous encapsulant material across the segment of the circular cross-section of the transparent tube, until the solar module is pressed onto the segment.

Therefore, activation of the heating element enables thermal transition and spatial distribution of the encapsulant material across the segment of the circular cross-section of the transparent tube, such that the encapsulant material is in a viscous state and distributed across the segment in preparation for pressing and adhesion of the solar module.

4.2.4 Sheet of Encapsulant Material+Heating Element

In one implementation, prior to navigation of the mandrel into the tube to locate the solar module within the transparent tube, a vacuum can be drawn at the set of perforations on the mandrel to transiently retain a sheet of encapsulant material on the mandrel. The mandrel can then be navigated into the transparent tube, as described above, to locate the sheet of encapsulant material facing the segment of the circular cross-section of the transparent tube. The vacuum can then be released at the set of perforations on the mandrel to release the sheet of encapsulant material from the mandrel and onto the segment of the circular cross-section of the transparent tube.

Furthermore, the heating element can then be activated to transition the sheet of encapsulant material to the viscous encapsulant material on the segment of the circular cross-section of the transparent tube. Accordingly, the mandrel can then be retracted from the transparent tube to retain the solar module onto the mandrel.

4.2.5 Sheet of Encapsulant Material+Ambient Air Evacuation

In one implementation, a sheet of encapsulant material (e.g., Ethylene-Vinyl Acetate) is arranged (e.g., via a carrier, vacuum insertion, rolling method, guided insertion) within the primary segment of the circular cross-section of the transparent tube. In this implementation, rather than inducing formation of a viscous liquid material, the sheet of encapsulant material (or multiple sheets of encapsulant material) is arranged within the transparent tube and the mandrel—supporting the solar module—is then inserted within the transparent tube in order to apply an outer side of the solar module to the sheet of encapsulant material arranged across the primary segment of the circular cross-section of the transparent tube. For example, a demilune sheet of encapsulant material (or multiple demilune sheets of encapsulant material) approximating the primary segment of the circular cross-section is arranged within the transparent tube. Accordingly, following application of the solar module within the transparent tube, pressure—such as via an inflatable element as described below—is applied to the solar module concurrent with evacuation of an ambient gaseous atmosphere within the transparent tube in order to induce lamination of the solar module via the sheet of encapsulant material.

4.2.5.1 Circular Segment Approximation

In one implementation, the set of solar cells is arranged into a laminated solar module such that an adhesive material (e.g., stacked sheet of encapsulant materials) arranged across the top side of each solar cell, in the set of solar cells, approximates a circular segment of the circular cross-section of the transparent tube. For example, a solar cell (e.g., defining a width of twenty-eight millimeters), occupying the primary segment of the circular cross-section of the transparent tube, defines a chord of the primary segment that forms a pocket (e.g., 3.2-millimeter pocket) between the solar cell and the inner wall of the transparent tube. Accordingly, the solar module can be formed to approximate this gap and thus, locate the top side of the solar module substantially flush to the inner surface of the transparent tube.

In this implementation, the solar module can include: a flexible backing (e.g., transparent polymer, silicone); a primary encapsulant layer (e.g., Ethylene-Vinyl Acetate) arranged over the backing; a primary row of solar cells arranged over the primary encapsulant layer; and a secondary row of solar cells arranged adjacent the primary row of solar cells and over the primary encapsulant layer. Furthermore, each solar cell, in the primary and secondary row of solar cells can include a top set of encapsulant layers (e.g., curing sheets): arranged in a stacked trapezoidal configuration (e.g., step-pyramid); and configured to approximate the circular segment (e.g., 3.2-millimeter pocket) of the chord formed by the solar cell occupying the primary segment of the circular cross-section of the transparent tube. Thus, the stacked encapsulant layers arranged across each solar cell, in the set of solar cells, cooperate—as described above—with a demilune sheet of encapsulant material arranged across the primary segment of the circular cross-section to approximate a pocket between the solar cell and the inner surface of the transparent tube.

Accordingly, lamination techniques can be implemented (e.g., solar laminator) to encapsulant the primary and secondary row of solar cells over the backing such that the solar module defines: a primary section approximating a primary circular segment of the circular cross-section of the transparent tube formed by the primary row of solar cells; and a secondary section approximating a secondary circular segment of the circular cross-section of the transparent tube formed by the secondary row of solar cells.

4.4 Closing the Offset Distance

Blocks of the method S100 also recite closing the offset distance, in Block S150, to: press the solar module, retained on the mandrel, against the primary encapsulant material; and adhere the solar module to the primary segment of the circular cross-section of the transparent tube.

Generally, in Block S150, pressure is applied to the mandrel to press the solar module against the primary encapsulant material on the segment of the circular cross-section of the transparent tube to: displace entrapped air from the bonding region; and initiate adhesion and lamination of the solar module onto the segment of the circular cross-section of the transparent tube.

4.4.1 Pressing the Solar Module onto the Encapsulant Material

In one implementation, a controller can trigger a linear actuator to linearly drive the transparent tube toward the mandrel to: press an outer face of the solar module, retained on the mandrel, against the encapsulant material; and adhere the solar module to the primary segment of the circular cross-section of the transparent tube. In another implementation, the controller can trigger a linear actuator (e.g., a ski) to linearly drive the mandrel toward the segment of the circular cross-section of the transparent tube.

In this implementation, as the solar module—retained on the mandrel—is pressed against the encapsulant material: entrapped air is displaced from the bonding interface between the solar module and the segment of the circular cross-section of the transparent tube; and the viscous encapsulant material substantially conforms to and occupies an interstitial region between the solar module and the transparent tube. For example, as the mandrel is rotated or linearly advanced during the pressing operation, pressure is distributed across the surface of the solar module to ensure progressive contact with the encapsulant material and continuous displacement of entrapped air along the segment of the circular cross-section of the transparent tube.

Therefore, the encapsulant material: mechanically adheres and laminates the solar module to the segment of the circular cross-section of the transparent tube; and transmits incident light through the transparent tube to the solar module with minimal optical loss that can result from refractive index mismatch and internal reflection at remaining air gaps between the solar module and the segment of the circular cross-section of the transparent tube.

4.4.2 Inflatable Element

Generally, an inflatable element is expanded within the transparent tube to apply pressure to the mandrel that drives the solar module—retained on the mandrel—toward the encapsulant material and thus, press the solar module against the encapsulant material (e.g., viscous encapsulant material, sheet of encapsulant material) to adhere the outer side of the solar module to the inner surface of the transparent tube. More specifically, the inflatable element is expanded to: press an outer face of the solar module, retained on the mandrel, against the primary encapsulant material; displace entrapped air between the solar module and the primary segment of the circular cross-section of the transparent tube; and adhere the solar module to the primary segment of the circular cross-section of the transparent tube.

In one implementation, the inflatable element: is arranged across the base of the mandrel, opposite the solar module, in a contracted configuration; and includes a valve coupled to an air supply (e.g., compressed air supply) configured to supply air to the inflatable element to enable transition of the inflatable element into an expanded configuration. In this implementation, the inflatable element is concurrently located within the transparent tube during an insertion operation of the mandrel—and therefore the solar module—within the transparent tube. During the insertion operation: the solar module is located adjacent the encapsulant material (e.g., viscous encapsulant material, sheet of encapsulant material) across the primary segment of the circular cross-section of the transparent tube; and the inflatable element, arranged over the mandrel, extends within the transparent tube opposite the solar module.

Accordingly, the air supply can then be triggered to transition the inflatable element into the expanded configuration. In the expanded configuration, the inflatable element abuts with the secondary segment (e.g., the top section) of the circular cross-section of the transparent tube, which in turn compresses the mandrel—and therefore the solar module—against the encapsulant material arranged across the primary segment, opposite the secondary segment, of the circular cross-section of the transparent tube. Thus, following a duration of time (e.g., between two and three hours) to allow for encapsulation and adhesion of the set of solar cells by the encapsulant material: the inflatable element is then transitioned into the contracted configuration to decrease pressure of the solar module against the inner surface of the transparent tube; and the solar module is then decoupled (e.g., via the vacuum supply) from the mandrel to apply the laminated solar sell assembly to the primary segment of the circular cross-section of the transparent tube.

Therefore, the lamination of the solar cells across the solar module and coupling of the solar module within the transparent tube can be performed in a single insertion and extraction operation of the mandrel within the transparent tube.

In one implementation, an inflatable element—separate from the mandrel—can be implemented in order to apply pressure within the transparent tube. In this implementation, following insertion of the mandrel—supporting the solar module—within the transparent tube, the solar module is then released from the mandrel (e.g., via the vacuum supply) to apply the solar module to the primary segment of the circular cross section of the transparent tube. Additionally, the mandrel is then retracted from the transparent tube and the inflatable element is then inserted within the transparent tube. Accordingly, the inflatable element can then be transitioned into the expanded configuration to apply pressure within the transparent tube to induce encapsulation of the solar cells within the transparent tube.

In another implementation, the inflatable element can passively expand to drive the solar module—retained on the module—toward the encapsulant material on the segment of the circular cross-section of the transparent tube. In this implementation, the mandrel and the inflatable element are inserted into the transparent tube. A vacuum is then drawn within the internal volume of the transparent tube to collapse the inflatable element. The interior of the inflatable element can then vent an interior of the inflatable element to ambient atmosphere—such as by manually or autonomously opening a valve coupled to the inflatable element—while maintaining the internal volume of the transparent tube under vacuum (or low pressure). Accordingly, the pressure differential between the interior of the inflatable element and the internal volume of the transparent tube results in expansion of the inflatable element to apply pressure against the mandrel—within the transparent tube—to drive the solar module toward the encapsulant material and adhere the solar module to the segment of the circular cross-section of the transparent tube.

4.4. Mandrel Weight

In one implementation, the mandrel is positioned within the transparent tube in an unrestrained state, free from active mechanical support or applied actuation during the pressing operation. In this implementation, the gravitational weight of the mandrel presses the solar module against the encapsulant material to: displace entrapped air from the bonding interface between the solar module and the segment of the circular cross-section of the transparent tube; and adhere and laminate the solar module onto the segment of the circular cross-section of the transparent tube.

For example, the mandrel can be inserted into the transparent tube such that it is cantilevered from the proximal end and allowed to settle to apply pressure, via the weight of the mandrel, to the solar module against the encapsulant material. Therefore, the weight of the mandrel can provide a passive pressure mechanism to initiate bonding of the solar module without requiring active force from actuators or the operator during the pressing of the solar module onto the encapsulant material.

4.4.4 Multi-Facet Solar Module Adhesion

In one implementation, the mandrel defines a V-shaped profile that includes a primary facet and a secondary facet. In this implementation, a primary portion of the solar module is retained along the primary facet of the mandrel, and a secondary portion of the solar module is retained along the secondary facet of the mandrel. Accordingly, the mandrel is then linearly driven toward the primary segment of the circular cross-section of the transparent tube to: press the primary portion of the solar module against encapsulant material along the primary segment; and adhere the primary portion of the solar module to the primary segment. The vacuum is then released at perforations on the primary facet of the mandrel to release the primary portion of the solar module from the mandrel and retain the primary portion of the solar module at the primary segment of the circular cross-section of the transparent tube.

Furthermore, the mandrel is then linearly driven toward a secondary segment, angularly offset from the primary segment of the circular cross-section of the transparent tube to: press the secondary portion of the solar module against the encapsulant material along the secondary segment; and adhere the secondary portion of the solar module to the secondary segment. The vacuum is then released at perforations on the secondary facet of the mandrel to release the secondary portion of the solar module from the mandrel and retain the secondary portion of the solar module at the secondary segment of the circular cross-section of the transparent tube.

In one example, the primary segment and the secondary segment are circumferentially adjacent regions that collectively span a semicircular portion of the circular cross-section of the transparent tube. Therefore, the V-shaped profile of the mandrel enables sequential bonding of opposing portions of the solar module to distinct angular segments of the transparent tube.

4.4.5 Rotating Mandrel

In one implementation, the mandrel defines a multi-faceted profile (e.g., a pentagonal or hexagonal cross-section) configured to support a plurality of solar module portions along respective flat facets of the mandrel. In this implementation, the mandrel is linearly driven toward the primary segment of the circular cross-section of the transparent tube to contact a primary edge of the solar module with a primary point on the primary segment of the circular cross-section of the transparent tube. The mandrel is then rotated to: roll an outer face of the solar module, retained on the mandrel, against the primary encapsulant material and along a circumferential path from the primary point on the primary segment; and adhere the solar module to the primary segment of the circular cross-section of the transparent tube.

In this implementation, the mandrel can include perforations along each facet of the mandrel. Accordingly, as the mandrel rotates within the transparent tube, vacuum can be sequentially released at perforations along each facet of the mandrel to: sequentially release a portion of the solar module retained at the facet from the mandrel; and retain the portion of the solar module to a corresponding segment of the circular cross-section of the transparent tube.

Additionally, the transparent tube can be supported by a set of rollers configured to passively or actively rotate the transparent tube in coordination with rotation of the mandrel, such that the outer face of the solar module maintains continuous rolling contact with the segment of the circular cross-section of the transparent tube during the pressing operation.

For example, the rollers can include passive low-friction bearings that allow the transparent tube to rotate in response to contact pressure from the rotating mandrel, or active motor-driven rollers controlled by a controller to synchronize tube rotation with the angular displacement of the mandrel. Therefore, coordinated rotation of the mandrel and the transparent tube enables controlled lamination of the solar module onto a segment of the circular cross-section of the transparent tube through progressive surface contact and uniform pressure application across the bonding interface.

4.5 Withdrawing the Mandrel

Blocks of the method S100 further recite: releasing the vacuum at the set of perforations on the mandrel to release the solar module from the mandrel in Block S170; and withdrawing the mandrel from the transparent tube in Block S175.

Generally, in Blocks S170 and S175, following pressing of the solar module against the encapsulant material, vacuum is released at the set of perforations on the mandrel to disengage the solar module from the mandrel, and the mandrel is withdrawn from the transparent tube.

In one implementation, an operator manually disconnects the mandrel from a vacuum supply to release the vacuum at the set of perforations and thereby disengage the solar module from the mandrel. The operator then manually withdraws the mandrel from the transparent tube.

In another implementation, a controller can: trigger a valve or vacuum pump to release vacuum at the set of perforations on the mandrel to disengage the solar module from the mandrel; and trigger an actuator to withdraw the mandrel from the transparent tube following release of the solar module.

In one example, the mandrel is coupled to a vacuum line via a quick-disconnect fitting. Upon completion of the pressing operation, the fitting is manually or automatically disengaged to vent the vacuum path and release the solar module from the mandrel. An actuator or operator then retracts the mandrel through the bore of the transparent tube. Therefore, releasing the vacuum at the set of perforations enables controlled separation of the solar module from the mandrel without disturbing the bonded interface, and withdrawing the mandrel clears the transparent tube for post-lamination processing, such as sealing or inspection.

4.6 Sealing

Blocks of the method S100 recite, following withdrawal of the mandrel from the transparent tube, locating a set of end caps on the transparent tube to enclose the solar module within the transparent tube in Block S180.

As described in U.S. Non-Provisional application Ser. No. 18/237,857, after evacuating and/or backfilling the transparent tube, the transparent tube is heated (e.g., via a localized gas flame) about a localized section of its perimeter that surrounds one of the terminals. Upon achieving a sufficiently low viscosity, the molten glass is then deformed and/or collapsed toward the longitudinal axis of the transparent tube into contact with the terminal enclosing the terminal about a continuous section of its surface, enabling the oxide layer on the terminal to diffuse into oxides within the molten glass and yielding a strong adhesive bond between the glass and the oxide surface of the terminal. As described above, the material of the terminal body (e.g., iron-nickel-cobalt, tungsten, molybdenum) can generally exhibit a coefficient of thermal expansion that is equal or substantially equal to the coefficient of thermal expansion of the glass (e.g., borosilicate glass) in order to maintain adhesion between the glass and the electrode surface as the glass cools and solidifies, thereby yielding an airtight and matched seal between the transparent tube and the terminal.

In another variation of the example implementation, the solar cell system can additionally and/or alternatively include a metal ring arranged at one or both ends of the transparent tube during the sealing process and configured to compress the transparent tube about the surface of the terminal. The metal ring can include a band of structural metal—such as steel, aluminum, or an aluminum alloy—of a geometry similar to and matching the surface dimensions of the terminal and defining a coefficient of thermal expansion greater than the coefficient of thermal expansion of the transparent tube.

During the sealing process, as the molten glass cools and solidifies, the metal ring contracts at a faster rate than the underlying glass, thereby exerting substantial compressive forces that further increase adhesion and seal strength between the transparent tube and the terminal. In use, the metal ring can provide a strong, dimensionally stable endcap of the transparent tube around the terminal that can further improve and/or maintain the strength of the seal throughout the operational lifespan of the solar cell system. Furthermore, in this variation of the example implementation, compressive forces applied around the seal by the metal ring can augment and/or replace adhesion yielded by matching coefficients of thermal expansion between the transparent tube and the terminal thereby enabling the solar cell system to include a wider range of metals and/or metal alloys in the terminal body and a wider selection of potential matching glass materials for the transparent tube.

4.7 Manufacturing Example: Pocket Gap Greater Than Two Millimeters

In one example, the solar module defines a chord (e.g., thirty-five millimeters) within the primary segment of the circular cross-section (e.g., of thirty-three-millimeter radius) of the transparent tube, such that a pocket gap (i.e., the circular segment formed by the chord) greater than two millimeters is formed interposed between an outer side of the solar module and the inner wall of the transparent tube.

In this example, an operator can: locate the solar module on the mandrel; and trigger a vacuum supply to induce suction coupling of the solar module to the mandrel. As described above, during insertion of the mandrel within the transparent tube, the nozzle—such as integrated into the mandrel—can dispense liquid encapsulant material (e.g., platinum-curing silicone) across the primary segment of the circular cross-section of the transparent tube. Alternatively, an adhesive dispenser—such as integrated into the mandrel—can dispense encapsulant material pellets across the primary segment, which can then be melted via heating of the transparent tube and/or application of a heat gun to the transparent tube. Following a primary duration of time (e.g., one hour), to allow for air gaps within the encapsulant material to release, the mandrel—supporting the solar module—can then be inserted into the transparent tube to locate an outer face of the solar module adjacent the encapsulant material across the primary segment of the circular cross-section of the transparent tube.

Upon locating the solar module adjacent the encapsulant material, an air supply can be triggered to expand an inflatable element—such as coupled to the mandrel as described above—in order to apply pressure between the solar module and the encapsulant material across the inner side of the transparent tube. In this example, the liquid encapsulant material across the primary segment fills and approximates the pocket gap (i.e., the pocket gap greater than two millimeters) between the solar module and the inner surface of the transparent tube during the application of pressure by the inflatable element. Accordingly, following a secondary duration of time (e.g., between two and three hours) to allow for encapsulation of the solar module to the inner surface of the transparent tube, the vacuum supply can then be switched-off to de-couple the solar module from the mandrel and thus, apply the solar module across the primary segment of the circular cross-section of the transparent tube.

The mandrel can then be extracted from the interior of the transparent tube. Following removal of the mandrel and the inflatable element, trace contaminants (e.g., oxygen and water molecules)—which might otherwise damage or reduce efficiency of the set of solar cells—can be evacuated from the transparent tube during the sealing process in order to extend a predicted life for the solar cell system. In variations of the example implementation, the method S100 can further include injecting a perovskite-compatible gaseous atmosphere (e.g., nitrogen or helium gas) into the transparent tube. Furthermore, a set of caps can then be: arranged at each end of the transparent tube to maintain the compatible gas within the transparent tube; and electrically coupled to the electrical pins of the set of solar cells to complete the manufacturing process.

4.8 Manufacturing Example: Pocket Gap Between One and Two Millimeters

In one example, the solar module defines a chord (e.g., twenty-one millimeters) within the primary segment of the circular cross-section (e.g., of thirty-three-millimeter radius) of the transparent tube, such that a pocket gap (i.e., the circular segment formed by the chord) between one and two millimeters is formed interposed between an outer side of the solar module and the inner wall of the transparent tube.

In this example, an operator can: locate the solar module on the mandrel; and trigger a vacuum supply to induce suction coupling of the solar module to the mandrel. More specifically, as described above, the solar module includes laminated solar cells (e.g., step laminated curing sheets) approximating the pocket gap (i.e., between one and two millimeters) interposed between the outer side of the solar module and the inner wall of the transparent tube. Thus, rather than dispensing encapsulant material in viscous and/or pellet form, a sheet of encapsulant material (e.g., Ethylene-Vinyl Acetate) is located (e.g., via a carrier, vacuum insertion, rolling method, guided insertion) across the primary segment of the circular cross-section of the transparent tube prior to insertion of the mandrel. Following dispensing of the sheet of encapsulant material, the mandrel is then inserted into the transparent tube to locate the outer side of the solar module adjacent the sheet of encapsulant material across the primary segment of the circular cross-section of the transparent tube.

Upon locating the solar module adjacent the encapsulant material, the vacuum supply can then be switched-off to de-couple the solar module from the mandrel and thus, apply the laminated solar cell assembly over the sheet of encapsulant material across the primary segment of the circular cross-section of the transparent tube. Furthermore, the mandrel can be extracted from the transparent tube and an inflatable element can then be inserted into the transparent tube. An air supply can then be triggered to expand the inflatable element—such as separate from the mandrel as described above—in order to apply pressure between the solar module and the sheet of encapsulant material across the inner side of the transparent tube. Additionally, concurrent to application of pressure, an ambient gaseous atmosphere can be evacuated (e.g., via a vacuum supply) from the transparent tube to trigger encapsulation of the set of solar cells—each solar cell including stacked curing sheets approximating the pocket gap—to the inner surface of the transparent tube. Accordingly, in this example, the application of pressure from the inflatable element and the evacuation of ambient gas from within the transparent tube induces melting of the encapsulant material that approximates the pocket gap within the transparent tube.

Accordingly, following a duration of time (e.g., between two and three hours) to allow for encapsulation of the solar module to the inner surface of the transparent tube, the air supply can then be switched-off to deflate the inflatable element. The inflatable element can then be extracted from the interior of the transparent tube. Following removal of the inflatable element, trace contaminates (e.g., oxygen and water molecules)—which might otherwise damage or reduce efficiency of the set of solar cells—can be evacuated from the transparent tube during the sealing process in order to extend a predicted life for the solar cell system. In variations of the example implementation, the method S100 can further include injecting a perovskite-compatible gaseous atmosphere (e.g., nitrogen or helium gas) into the transparent tube. Furthermore, a set of caps can then be: arranged at each end of the transparent tube to maintain the compatible gas within the transparent tube; and electrically coupled to the electrical pins of the set of solar cells to complete the manufacturing process.

4.9 Manufacturing Example: Pocket Gap Less Than One Millimeter

In one example, the solar module defines a chord (e.g., 10.5 millimeters) within the primary segment of the circular cross-section (e.g., of thirty-three-millimeter radius) of the transparent tube, such that a pocket gap (e.g., i.e., the circular segment formed by the chord) of less than one millimeter is formed interposed an outer side of the solar module and the inner wall of the transparent tube.

In this example, an operator can: locate the solar module on the mandrel; and trigger a vacuum supply to induce suction coupling of the solar module to the mandrel. More specifically, as described above, the solar module can include: a flexible backing; a primary row of solar cells arranged on the backing; a secondary row of solar cells arranged adjacent the primary row of solar cells on the backing; and a glass layer (e.g., tempered glass layer) arranged over the primary and secondary row of the solar cells. An sheet of encapsulant material (e.g., Ethylene-Vinyl Acetate) is then located (e.g., via a carrier, vacuum insertion, rolling method, guided insertion) across the primary segment of the circular cross-section of the transparent tube prior to insertion of the mandrel. In this example, rather than implementing step laminated curing sheets on each solar cell across the primary and secondary row of solar cells as described above, a single or double layer of sheet of encapsulant material arranged within the transparent tube approximates the less than one millimeter gap formed by the solar module and the inner surface of the transparent tube. Thus, following dispensing of the sheet of encapsulant material, the mandrel is then inserted into the transparent tube to locate the outer side of the solar module adjacent the sheet of encapsulant material across the primary segment of the circular cross-section of the transparent tube.

Upon locating the solar module adjacent the sheet of encapsulant material, the vacuum supply can then be switched-off to de-couple the solar module from the mandrel and thus, apply the laminated solar cells assembly over the single or double sheet of encapsulant material layer across the primary segment of the circular cross-section of the transparent tube. Furthermore, the mandrel can be extracted from the transparent tube and an inflatable element can then be inserted into the transparent tube. An air supply can then be triggered to expand the inflatable element—such as separate from the mandrel as described above—in order to apply pressure between the solar module and the sheet of encapsulant material across the inner side of the transparent tube. Additionally, concurrent to application of pressure, an ambient gaseous atmosphere can be evacuated (e.g., via a vacuum supply) from the transparent tube to trigger encapsulation of the set of solar cells to the inner surface of the transparent tube. Accordingly, in this example, the application of pressure from the inflatable element and the evacuation of ambient gas from within the transparent tube induces melting of the sheet of encapsulant materials to approximate the pocket gap within the transparent tube.

Accordingly, following a duration of time (e.g., between two and three hours) to allow for encapsulation of the solar module to the inner surface of the transparent tube, the air supply can then be switched-off to deflate the inflatable element. The inflatable element can then be extracted from the interior of the transparent tube. Following removal of the inflatable element, trace contaminants (e.g., oxygen and water molecules)—which might otherwise damage or reduce efficiency of the set of solar cells—can be evacuated from the transparent tube during the sealing process in order to extend a predicted life for the solar cell system. In variations of the example implementation, the method S100 can further include injecting a perovskite-compatible gaseous atmosphere (e.g., nitrogen or helium gas) into the transparent tube. Furthermore, a set of caps can then be: arranged at each end of the transparent tube to maintain the compatible gas within the transparent tube; and electrically coupled to the electrical pins of the set of solar cells to complete the manufacturing process.

5. Variation: Solar Module+Sheet of Encapsulant Material

In one variation, the solar module includes a sheet of encapsulant material arranged across an outer face of the solar module. The sheet can be pre-formed to approximate the curvature of a segment of the circular cross-section of the transparent tube to facilitate uniform contact during pressing. Additionally, the mandrel can define a muti-faceted support region (e.g., pentagonal support region) that locates rows (e.g., five rows) of solar cells on the solar module on the mandrel.

In this variation, the mandrel is inserted into the mandrel to locate the outer face of the solar module: facing the segment of the circular cross-section of the transparent tube; and at an offset distance from the segment of the circular cross-section. As described above, during an adhesion process, the mandrel is driven toward the segment of the circular cross-section to close the offset distance and press the solar module against the segment of the circular cross-section.

Furthermore, the heating element is then activated to transition the sheet of encapsulant material into a viscous encapsulant material. The combination of pressing the solar module against the segment and transitioning the sheet of encapsulant material into the viscous encapsulant material results in: displacement of entrapped air between the outer face of the solar module and the segment; substantial occupation of the interstitial region by the viscous encapsulant material; and adherence and lamination of the solar module to the segment of the circular cross-section of the transparent tube.

In this variation, Blocks of the method S100 described above can be executed to: close the offset distance; release the solar module from the mandrel; and withdraw the mandrel from the transparent tube.

Therefore, rather than dispensing the encapsulant material onto the segment prior to or during insertion of the mandrel into the transparent tube, the application and lamination of the encapsulant material occur concurrently during the pressing operation.

5.1 Reflective Element

In one variation, Blocks of the method S100 can be implemented to adhere a reflective element (e.g., diffuse reflector, specular reflector) to a secondary segment, opposite the primary segment, of the circular cross-section of the transparent tube.

In this variation, as described above, encapsulate material can be dispensed along the secondary segment of the circular cross-section of the transparent tube. Subsequently, vacuum is drawn—via a vacuum supply—at the perforations on the mandrel to transiently retain the reflective element on the mandrel. The mandrel is then navigated into the transparent tube to locate the reflective element: opposite the solar module adhered to the primary segment of the circular cross-section of the transparent tube; facing the encapsulant material on the secondary segment of the circular cross-section; and at an offset distance from the secondary segment of the circular cross-section of the transparent tube.

Accordingly, techniques described above can be implemented to close the offset distance to: press the reflective element against the encapsulant material on the secondary segment of the circular cross-section of the transparent tube; and adhere the reflective element to the secondary segment of the circular cross-section. The vacuum at the set of perforations is then released to release the reflective element from the mandrel and retain the reflective element on the secondary segment of the circular cross-section of the transparent tube.

Thus, the system can leverage steps and techniques described above to adhere multiple components (e.g., solar modules, reflective elements) to the interior surface of the transparent tube.

5.2 Backsheet Lamination

In another variation, steps and techniques described above can be implemented to adhere a backsheet (e.g., a polymeric or composite layer) to a rear face of the solar module following adhesion of the front face of the solar module to the segment of the circular cross-section of the transparent tube.

In this variation, following adhesion of the front face of the solar module to the segment of the circular cross-section of the transparent tube, vacuum is drawn at the set of perforations on the mandrel to retain the backsheet on the mandrel. Subsequently, the mandrel is navigated into the transparent tube to locate the backsheet: facing the rear face of the solar module adhered to the segment on the circular cross-section of the transparent tube; and at an offset distance from the rear face of the solar module.

Steps and techniques described above can be implemented to close the offset distance in order to adhere and laminate the backsheet over the rear face of the solar module on the segment of the circular cross-section of the transparent tube. Thus, the backsheet provides electrical insulation, moisture resistance, mechanical protection, and environmental shielding for the solar module following lamination of the solar module to the segment of the circular cross-section of the transparent tube.

6. Disclaimer

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for manufacturing a photovoltaic tube comprising:

loading a transparent tube onto a jig;

dispensing a primary encapsulant material onto a primary segment of a circular cross-section of the transparent tube;

drawing a vacuum at a set of perforations on a mandrel to transiently retain a solar module on the mandrel;

navigating the mandrel into the transparent tube to locate the solar module:

facing the primary encapsulant material on the primary segment of the circular cross-section of the transparent tube; and at an offset distance from the primary segment of the circular cross-section of the transparent tube;

closing the offset distance to:

press the solar module, retained on the mandrel, against the primary encapsulant material; and adhere the solar module to the primary segment of the circular cross-section of the transparent tube;

releasing the vacuum at the set of perforations on the mandrel to release the solar module from the mandrel; and withdrawing the mandrel from the transparent tube.

2. The method of claim 1:

wherein dispensing the primary encapsulant material onto the primary segment of the circular cross-section of the transparent tube comprises:

dispensing a solid encapsulant material from a nozzle, arranged at a distal end of the mandrel, onto the primary segment of the circular cross-section of the transparent tube during navigation of the mandrel into the transparent tube;

further comprising:

activating a heating element arranged proximal the transparent tube to transition the solid encapsulant material into a viscous encapsulant material on the primary segment of the circular cross-section of the transparent tube; and wherein closing the offset distance comprises closing the offset distance to press the solar module, retained on the mandrel, against the viscous encapsulant material to substantially fill an interstice between an outer surface of the solar module and the primary segment of the circular cross-section of the transparent tube.

3. The method of claim 1:

wherein dispensing the primary encapsulant material onto the primary segment of the circular cross-section of the transparent tube comprises locating a sheet of encapsulant material across the primary segment of the circular cross-section of the transparent tube;

further comprising:

activating a heating element arranged proximal the transparent tube to transition the sheet of encapsulant material to a viscous encapsulant material on the primary segment of the circular cross-section of the transparent tube; and wherein closing the offset distance comprises closing the offset distance to press the solar module, retained on the mandrel, against the viscous encapsulant material to substantially fill an interstice between an outer surface of the solar module and the primary segment of the circular cross-section of the transparent tube.

4. The method of claim 1, wherein closing the offset distance comprises linearly driving the transparent tube toward the mandrel to:

press an outer face of the solar module, retained on the mandrel, against the encapsulant material; and adhere the solar module to the primary segment of the circular cross-section of the transparent tube.

5. The method of claim 1, wherein closing the offset distance comprises expanding an inflatable element, arranged on the mandrel opposite the solar module, within the transparent tube to:

press an outer face of the solar module, retained on the mandrel, against the primary encapsulant material; and adhere the solar module to the primary segment of the circular cross-section of the transparent tube.

6. The method of claim 1, wherein closing the offset distance comprises closing the offset distance to set the mandrel on the primary segment of the circular cross-section of the transparent tube to:

press, via a weight of the mandrel, an outer face of the solar module, retained on the mandrel, against the primary encapsulant material; and adhere the solar module to the primary segment of the circular cross-section of the transparent tube.

7. The method of claim 1:

wherein navigating the mandrel into the transparent tube comprises triggering a linear actuator to maneuver the mandrel into the transparent tube to locate the solar module:

facing the primary encapsulant material on the primary segment of the circular cross-section of the transparent tube; and at the offset distance from the primary segment of the circular cross-section of the transparent tube; and wherein closing the offset distance comprises triggering a ski to drive the mandrel toward the primary segment of the circular cross-section of the transparent tube to:

press the solar module, retained on the mandrel, against the primary encapsulant material; and adhere the solar module to the primary segment of the circular cross-section of the transparent tube.

8. The method of claim 1:

further comprising:

dispensing a secondary encapsulant material onto a secondary segment, adjacent the primary segment, of the circular cross-section of the transparent tube; and wherein closing the offset distance comprises:

at a primary time, linearly driving the mandrel toward the primary segment of the circular cross-section of the transparent tube to:

press a primary portion of the solar module against the primary encapsulant material; and adhere the primary portion of the solar module against the primary segment of the circular cross-section of the transparent tube; and at a secondary time following the primary time, linearly driving the mandrel toward a secondary segment of the circular cross-section of the transparent tube to:

press a secondary portion of the solar module against the secondary encapsulant material; and adhere the secondary portion of the solar module against the secondary segment of the circular cross-section of the transparent tube.

9. The method of claim 1, wherein closing the offset distance comprises:

linearly driving the mandrel toward the primary segment of the circular cross-section of the transparent tube to contact a primary edge of the solar module with a primary point on the primary segment of the circular cross-section of the transparent tube; and rotating the mandrel to:

roll an outer face of the solar module, retained on the mandrel, against the primary encapsulant material and along a circumferential path from the primary point on the primary segment; and adhere the solar module to the primary segment of the circular cross-section of the transparent tube.

10. The method of claim 1, further comprising, following withdrawal of the mandrel from the transparent tube, locating a set of end caps on the transparent tube to enclose the solar module within the transparent tube.

11. A method for manufacturing a photovoltaic tube comprising:

loading a transparent tube onto a jig;

drawing a vacuum at a set of perforations on a mandrel to transiently retain a solar module on the mandrel, the solar module comprising a sheet of encapsulant material arranged across an outer face of the solar module;

navigating the mandrel into the transparent tube to locate the outer face of the solar module at an offset distance from a primary segment of a circular cross-section of the transparent tube;

during an adhesion period:

closing the offset distance to press the sheet of encapsulant material, arranged across the outer face of the solar module retained on the mandrel, against the primary segment of the circular cross-section of the transparent tube; and activating a heating element arranged proximal the transparent tube to:

transition the sheet of encapsulant material to a viscous encapsulant material; and adhere the solar module to the primary segment of the circular cross-section of the transparent tube;

releasing the vacuum at the set of perforations on the mandrel to release the solar module from the mandrel; and withdrawing the mandrel from the transparent tube.

12. The method of claim 11, wherein closing the offset distance comprises expanding an inflatable element, arranged on the mandrel opposite the solar module, within the transparent tube to press the sheet of encapsulant material, arranged across the outer face of the solar module, against the primary segment of the circular cross-section of the transparent tube.

13. The method of claim 11, wherein closing the offset distance comprises closing the offset distance to set the mandrel on the primary segment of the circular cross-section of the transparent tube to press, via a weight of the mandrel, the sheet of encapsulant material against the primary segment of the circular cross-section of the transparent tube.

14. The method of claim 11, wherein closing the offset distance comprises:

linearly driving the mandrel to contact a primary edge of the sheet of encapsulant material, arranged across the outer face of the solar module retained on the mandrel, with a primary point on the primary segment of the circular cross-section of the transparent tube; and rotating the mandrel to roll the sheet of encapsulant material against and along a circumferential path from the primary point on the primary segment to adhere the solar module to the primary segment of the circular cross-section of the transparent tube.

15. The method of claim 11, wherein activating the heating element arranged proximal the transparent tube comprises, during closing of the offset distance, activating the heating element arranged proximal the transparent tube to:

transition the sheet of encapsulant material into the viscous encapsulant material that substantially fills an interstice between the outer face of the solar module and the primary segment of the circular cross-section of the transparent tube.

* * * * *